June 29, 1926. Re. 16,371

N. TRBOJEVICH

GEAR

Original Filed Jan. 3, 1922 2 Sheets-Sheet 1

Inventor
Nikola Trbojevich

By B. E. Shlesinger
his Attorney

June 29, 1926. Re. 16,371

N. TRBOJEVICH

GEAR

Original Filed Jan. 3, 1922 2 Sheets-Sheet 2

Inventor
Nikola Trbojevich

By B. F. Schlesinger
his Attorney

Patented June 29, 1926. Re. 16,371

UNITED STATES PATENT OFFICE.

NIKOLA TRBOJEVICH, OF HIGHLAND PARK, MICHIGAN, ASSIGNOR TO GLEASON WORKS, OF ROCHESTER, NEW YORK, A CORPORATION OF NEW YORK.

GEAR.

Original No. 1,465,149, dated August 14, 1923, Serial No. 526,510, filed January 3, 1922. Application for reissue filed March 14, 1925. Serial No. 15,664.

This invention relates to gears. In particular the invention relates to spiral bevel gears, to worms and to pairs of mating gears.

One of the objects of my invention is to obtain a form of spiral bevel gear which may be hobbed.

A further object of the invention is the provision of a new form of worm which may form one of a pair of mating gears.

A still further object of my invention is to obtain a form of spiral bevel gear which is capable of meshing either with a second spiral bevel gear or with a worm corresponding in form to the hob employed to produce such gear.

Other objects will appear hereinafter from the specification and from the appended claims.

The process employed in hobbing the new form of spiral bevel gears, as well as the construction of hob which is used are also inventions of mine, but the present application refers solely to gears such as may be produced by the process and hob, or such as conform in structure to the hob.

For the purpose of clearly describing my invention, reference is had to the accompanying drawings, in which are illustrated various embodiments of my invention it being understood, however, that my invention is not restricted to the particular embodiments shown but is capable of various modifications within the scope of the invention and the limits of the appended claims.

This invention as previously indicated resides in a novel form of spiral bevel gear, in a novel form of worm and in a novel pair of gears. I shall first described my novel form of spiral bevel gear.

One novel characteristic of my improved spiral bevel gear is the form of the tooth in longitudinal contour, which is such that the successive teeth are non-parallel and of changing cross-section but which nevertheless can be generated from a rack of constant pitch. The curve of the tooth longitudinally is what may be termed a "modified" involute of a circle and it may be either of two types, respectively designated as "extended" involutes and "abridged" involutes. These will be best understood by reference to the preferred method for generating the same.

Figure 1:
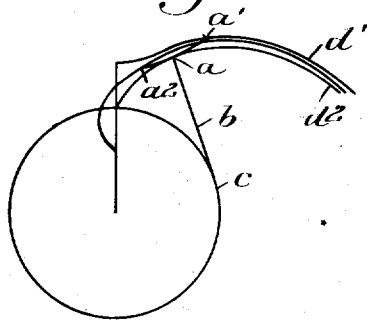
Figures 1 to 3 are the diagrammatic views illustrating the geometrical principles involved.

As shown in Fig. 1, $a$ is a point on a line $b$ which is rolled without sliding about a circle $c$ and which traces a line that is a true involute of a circle. If the point $a$ is offset from the line $b$, either outwardly or inwardly, as indicated at $a'$ and $a^2$, such offset points, if maintained in rigid relation to the line $b$, will trace modified involute curves $d'$ and $d^2$. These are non-parallel with the curve $d$, but constantly approach the latter and will merge with the same at an infinite distance.

Figure 2:
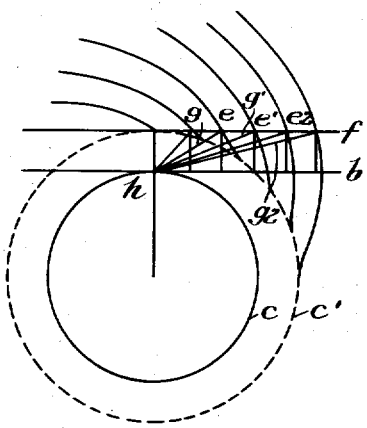

Figure 2 shows a series of extended involute curves which are generated by equispaced points $e$, $e'$, etc., on the line $f$ parallel to and outwardly spaced from the line $b$. Such curves are non-parallel and outwardly divergent and the normals $g$, $g'$, etc., drawn from each curve at the point of intersection with the line $f$ will all intersect in the point $h$, which is the point of tangency of the line $b$ with the base circle $c$.

Figure 3:
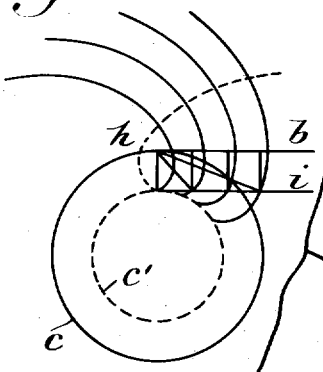

Figure 3 shows a series of abridged involute curves which are generated by equispaced points upon the line $i$ inwardly offset from the line $b$. These curves are also non-parallel and outwardly divergent and moreover the normals drawn from the respective curves at the points of intersection with the line $i$ will all pass through the point $h$, which is the point of tangency of the line $b$.

If the line $f$, Figure 2, is regarded as a rack of constant pitch and infinitesimal thickness, this in the movement previously described will generate spiral teeth of a crown gear, and by reason of the fact that the rack is constantly changing its angular relation to the curves, the teeth generated and also the interdental spaces will be non-parallel, of progressively increasing width and of modified involute curvature.

The peculiar characteristics of these curves is that any series traced by equi-spaced points on the offset line may be arranged tangent to any other series of curves traced by equally spaced points on a line equally offset whether the base circles for the two series are the same or different, or whether the offsetting of the line is inward or outward from the base circle, the one generating abridged modified involute curves and the other extended modified involute curves. Where the inward offsetting of the line is equal to the radius of the base circle, the curves generated become Archimedean spirals and may in development form a helix of constant lead on the surface of the cone. Therefore, by constructing a conical hob, which in axial section forms a rack of constant pitch, such a hob is capable of generating in the gear blank non-parallel curves of the character described and without interference or mutilation.

Figure 5:
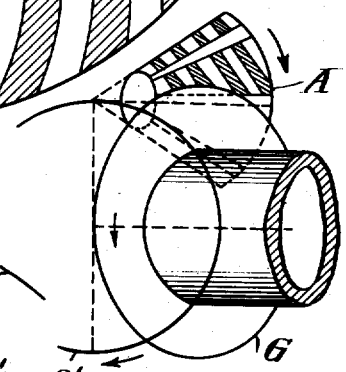
Figure 5 is a plan view of the same.
Figure 4:
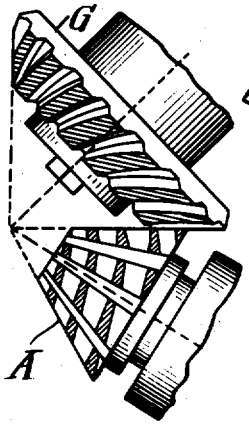
Figure 4 shows a side elevation of the gear and hob illustrating the method of generation.

The method of generating my improved spiral bevel gears forms the subject-matter of another application for patent, but, in brief, it consists; first, in forming a preferably tapering or conical hob A, Figure 4, which in longitudinal section is a rack of constant pitch corresponding to the pitch desired in the gears to be generated; second, in setting the hob in relation to the gear blank G so that the pitch cones thereof are tangent to a common plane and the axis of the hob is offset from the imaginary base circle of the gear to be generated equal to the radius of its own base circle; third, in relatively rotating the hob and the gear blank so that each revolution of the hob will advance one tooth of the gear if the hob is of single thread or a plurality of teeth if of multiple thread; fourth, in imparting a movement of translation of the hob about a segment of the base circle of the gear blank, such movement being sufficient to pass completely across the face of the blank, as indicated in Figure 5.

Figure 7:
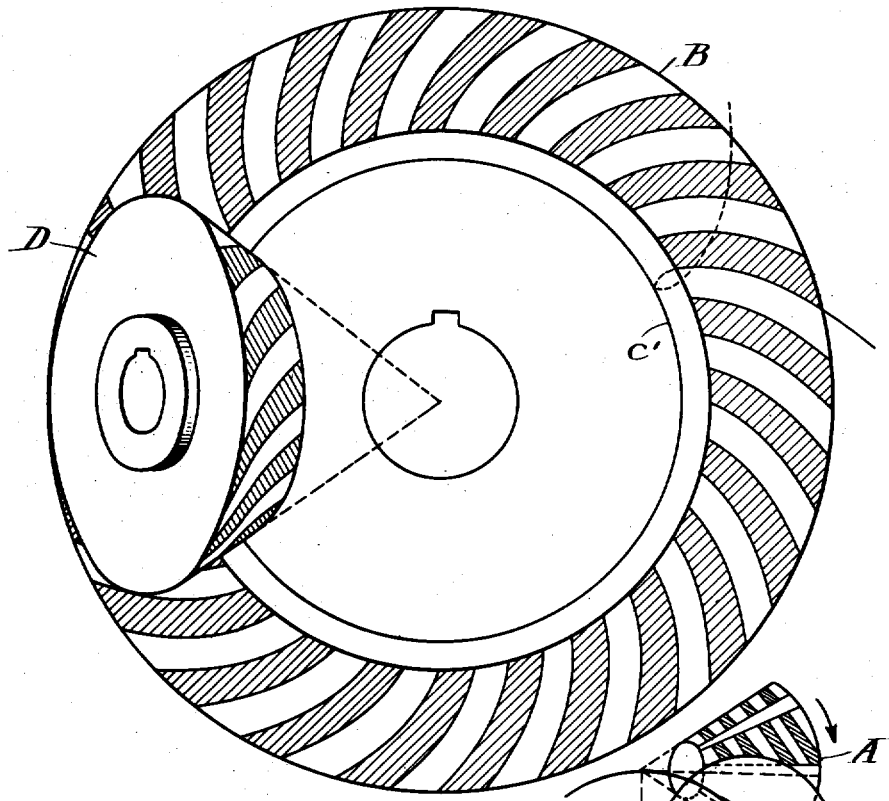
Figure 7 is a sectional plan view of a crown gear and pinion of the abridged type.
Figure 6:
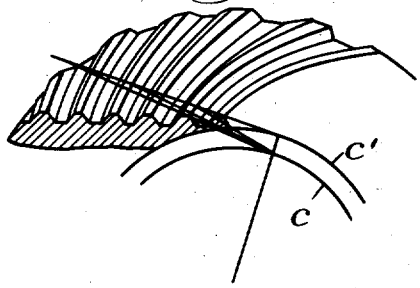
Figure 6 shows a portion of a gear of the extended type in sectional perspective.

Figure 6 illustrates a portion of a spiral bevel gear of my improved construction in which the teeth are shown to be generated by a rack of constant pitch and to have a longitudinal curvature of an extended involute. Figure 7 is a plan view showing a crown gear B in mesh with a pinion D both of abridged modified involute curvature. Either form of gear will perfectly mesh with a similar gear of the opposite hand (right or left), which is generated by an equal hob of the opposite hand. Also, all gears which are generated by the same hob and which have the same base circle will mesh with all gears generated by an equal hob of the opposite hand and which have the same base circle.

The hob employed in producing the spiral bevel gear described is of novel structure and forms the subject of a separate application. I have discovered that if a worm be constructed of a form corresponding to that of the hob, that this new worm may form one of a new pair of mating gears and that, in particular, it may be employed as one of a new pair of mating gears of which the other member is one of the spiral bevel gears already described. As far as I am aware this is the first use of a spiral bevel gear or of a gear cut from a conical blank in mesh with a worm.

Figure 8:
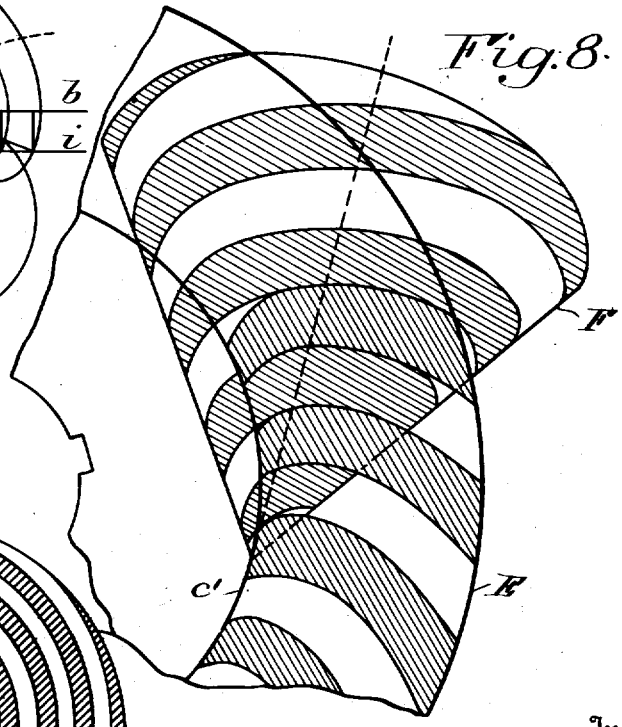
Figure 8 is a similar view of the improved gear meshing with a taper worm.
Figure 9:
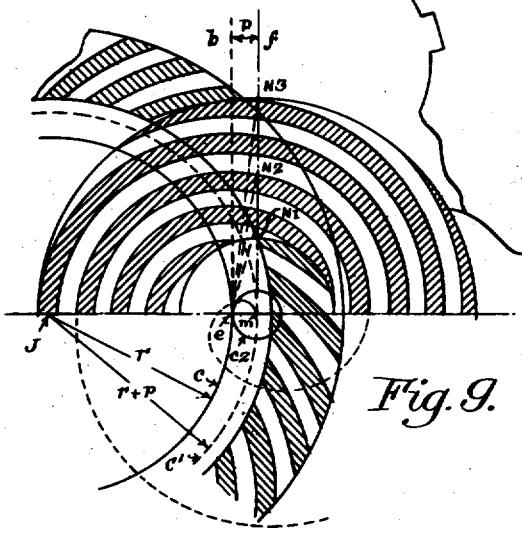

The new worm which is preferably of tapered form, like the hob, will be of constant pitch in axial section and of changing lead angle. It has a thread one side of which is convex and the other concave. A tapering worm F, such as forms the subject of this invention, is illustrated in Figure 8, where I have diagrammatically shown that my improved gear E can be superposed over the worm and will mesh with same correctly and without interference, and any one of the series of gears E generated by the same hob and having the same base circle will mesh equally well with such a tapering worm if the latter corresponds in form to the generating hob.

The worm, as clearly described in my co-pending application on the hob, has a thread which can mesh with the crown gears diagrammatically illustrated in Figures 2 and 3 which may also be considered developments of the spiral bevel gears already described, along the lines *f* or *i*, the rack section of the worm coinciding with the rack section of the crown gears along these lines, the worm meshing with the crown gears, or gears in development, along a generatrix of its pitch surface.

In development, as explained in my application on the hob, the line *f* or *i* along which the worm and spiral bevel gear mesh will be perpendicular to a line connecting their respective apexes, and the pitch surfaces of the worm and gear will match each other along this line, while the normals along this line to the teeth of the gear and to the threads of the worm at their respective pitch surfaces will intersect in the same point *h*. Like the hob and blank, the worm and gear will preferably be set so that their respective pitch surfaces are tangent to a common plane with the axis of the worm offset from the imaginary base circle of the gear to be generated by an amount equal to the radius of its own base circle, i. e., in development the base circles of the worm and gear, in the preferred arrangement, will be tangent, one to the other.

While I have described my invention in connection with specific gear structures and in connection with specific uses for such structures as members of particular pairs of mating gears and in connection with specific settings for the members of such pairs, it is to be understood that the structures of the gears may be modified, that the gears themselves are capable of various uses and that the settings may be varied, without departing from the intent of the invention or the scope of the following claims, and that this invention is intended to cover any adaptations or embodiments, following, in general, the principles of the invention and including such departures from the present disclosure as come within known or customary practice in the gear art and may be applied to the essential features hereinbefore set forth and as fall within the limits of the appended claims.

Having thus described my invention, what I claim is:

1. A bevel gear of a form such as might be generated by rolling a conical blank upon a crown gear, the latter having a series of teeth which are longitudinally of modified involute curvature and are non-parallel.

2. A bevel gear of a form such as might be generated by rolling a conical blank upon a crown gear, the latter having a series of teeth which are longitudinally of modified involute curvature and are non-parallel, said curves in the pitch plane being generated by equi-spaced points on a line parallel to and in rigid relation to a line rolling, without sliding, upon a base circle.

3. A bevel gear of a form such as might be generated by rolling a conical blank on a crown gear, the latter having teeth which are substantially such as generated by the movement of a rack of constant pitch in fixed parallel spaced relation to a line rolling upon a base circle concentric with the axis of the crown gear.

4. A bevel gear wheel of a form which might be generated by rolling a conical blank upon a crown gear, having teeth longitudinally of modified involute outwardly divergent curvature, all of said curves being substantially such as may be traced by points on a line in fixed spaced parallel relation to a line rolling, without sliding, upon a base circle concentric with the axis of the crown gear.

5. A system of mating spiral bevel gears arranged with their axes non-intersecting and non-parallel the teeth of which in their longitudinal contour are spirals of the general involute type having different base radii but the same absolute value of modification with respect to a common involute of a circle.

6. A system of mating spiral bevel gears having their axes non-intersecting and non-parallel, the teeth of which may be generated by the movement of a rack of constant pitch rolling on the pitch cones of conical blanks along a series of geodesic lines.

7. A system of mating spiral gears, one of which is beveled, said gears having axes which are non-intersecting and non-parallel and the longitudinal curvature of the teeth of which are in development respectively Archimedean spirals and modified involute curves.

8. A system of mating spiral gears having their axes non-intersecting and non-parallel, one of said gears being a conical screw which may be developed by a rack of constant pitch, while the other is a conjugate wheel generated by said conical screw when both are brought into a mutual tangential position and rotated in reverse ratio to their respective numbers of threads or teeth.

9. A system of mating spiral gears having their axes non-intersecting and non-parallel, one of said gears being a conical screw which may be developed by a rack of constant pitch, while the other is a conjugate wheel generated by said conical screw when both are brought into mutual tangential position and are rotated in reverse ratio of their respective numbers of threads or teeth while the screw is being swung bodily about an axis intersecting the axis of the wheel.

10. A bevel gear of a form such as might be generated by rolling a conical blank upon a crown gear, the latter having a series of teeth, so curved longitudinally that normals thereto drawn from the points of intersection of said teeth with a straight line offset from the center of the crown gear and extending between the center of the crown gear and the inner end of its teeth and lying in the pitch plane of the crown gear all meet in a single point.

11. A pair of meshing gears arranged with axes non-intersecting and non-parallel consisting of a bevel gear having non-parallel curved teeth and a taper worm of constant lead.

12. A taper worm having a pitch surface generated by a straight line and having a thread of constant pitch.

13. A pair of meshing gears arranged with axes non-intersecting and non-parallel consisting of a taper worm having a pitch surface generated by a straight line and having thread of constant pitch and of a mating gear having teeth formed on a side face.

14. A pair of gears consisting of a worm having its pitch surface generated by a straight line and a bevel gear.

15. A pair of gears consisting of a worm having its pitch surface generated by a straight line and having a thread of constant pitch and a curved tooth bevel gear.

16. A pair of meshing gears arranged with axes non-intersecting and non-parallel comprising a taper worm and a bevel gear.

17. A pair of meshing gears arranged with axes non-intersecting and non-parallel consisting of a taper worm and a tapered curved tooth gear.

18. A pair of mating gears each of which is such as might be generated by rolling a conical blank upon a crown gear, the latter having a series of teeth which are of constant pitch along a straight line offset from the center of the crown gear, the axes of said gears being non-intersecting and non-parallel.

19. A pair of meshing tapered gears arranged with their axes non-intersecting and non-parallel the teeth of which in their longitudinal contour are spirals of the general involute type.

20. A pair of meshing gears, each of which has teeth which, in development, are longitudinally of modified involute curvature.

21. A pair of meshing tapered gears provided with longitudinally curved teeth and arranged with axes non-intersecting and non-parallel, each of said gears being of constant pitch, in development, along a straight line lying in the plane of the development and passing through the apex of one of the gears.

22. A pair of tapered meshing gears arranged with axes non-intersecting and non-parallel, one of which has teeth which, in development, are longitudinally of modified involute curvature.

23. A pair of tapered meshing gears, one of which has teeth which in development longitudinally are Archimedean spirals.

24. A pair of tapered meshing gears, arranged with their axes non-intersecting and non-parallel, one of which has teeth which in development are longitudinally spirals of the general involute type.

25. A pair of meshing curved tooth gears, the longitudinal curvature of whose teeth is derived from a base circle, said gears being arranged so that in development the base circles from which the longitudinal curvature of their teeth is derived are tangent.

26. A pair of meshing tapered gears arranged with axes non-intersecting and non-parallel, whose pitch lines, in development, are tangent along a straight line lying in the plane of the development and perpendicular to a line connecting their respective apexes.

27. A pair of meshing tapered gears arranged with axes non-intersecting and non-parallel, which are of constant pitch, in development, along a straight line lying in the plane of the development and perpendicular to a line connecting their respective apexes.

NIKOLA TRBOJEVICH.